(12) United States Patent
Han et al.

(10) Patent No.: US 12,474,743 B2
(45) Date of Patent: Nov. 18, 2025

(54) ELECTRONIC DEVICE

(71) Applicant: HUAWEI TECHNOLOGIES CO., LTD., Guangdong (CN)

(72) Inventors: Dongdong Han, Xi'an (CN); Shoulin Chi, Shenzhen (CN); Tai Huang, Dongguan (CN); Xiao Luo, Shenzhen (CN); Jiajie Si, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/552,836

(22) PCT Filed: Mar. 29, 2022

(86) PCT No.: PCT/CN2022/083536
§ 371 (c)(1),
(2) Date: Sep. 28, 2023

(87) PCT Pub. No.: WO2022/213841
PCT Pub. Date: Oct. 13, 2022

(65) Prior Publication Data
US 2024/0061476 A1  Feb. 22, 2024

(30) Foreign Application Priority Data

Apr. 8, 2021 (CN) .......................... 202110379344.8
May 13, 2021 (CN) .......................... 202110522258.8

(51) Int. Cl.
*G06F 1/16* (2006.01)
*H05K 5/02* (2006.01)

(52) U.S. Cl.
CPC .......... *G06F 1/1656* (2013.01); *G06F 1/1688* (2013.01); *H05K 5/0243* (2013.01)

(58) Field of Classification Search
CPC .... G06F 1/1637; G06F 1/1656; H05K 5/0243
See application file for complete search history.

(56) References Cited

U.S. PATENT DOCUMENTS 7,907,394 B2 * 3/2011 Richardson ........... G06F 1/1613
361/679.02
8,675,359 B2 * 3/2014 Chen ...................... A45C 11/00
455/575.8

(Continued)

FOREIGN PATENT DOCUMENTS

CN  103405078 A  * 11/2013  ........... A47G 1/0611
WO  2014029126 A1   2/2014

*Primary Examiner* — Adrian S Wilson
(74) *Attorney, Agent, or Firm* — WOMBLE BOND DICKINSON (US) LLP (57) ABSTRACT

A protection assembly of the electronic device is disposed along a side edge of a display screen assembly, and includes a decorative layer, a support, and a buffer layer. The support is located on a side of the display screen assembly, and is fastened to the side edge of the display screen assembly. The decorative layer is located on an outer side of the display screen assembly and the support. A first part of the decorative layer is bonded to a first surface of the support through a first adhesive layer, a second part of the decorative layer abuts against a screen surface through the buffer layer, and the first surface is a surface that is on the support and that is located on a side of the screen surface of the display screen assembly.

17 Claims, 6 Drawing Sheets

(56) References Cited

U.S. PATENT DOCUMENTS

| | | | | |
|---|---|---|---|---|
| 10,372,166 B2* | 8/2019 | Gable | | H05K 5/15 |
| 10,791,644 B2* | 9/2020 | Pakula | | H04M 1/0277 |
| 10,820,438 B2 | 10/2020 | Lu et al. | | |
| 12,142,819 B2* | 11/2024 | Kuna | | G06F 1/1656 |
| 2009/0141436 A1* | 6/2009 | Matsuoka | | G06F 1/1626 |
| | | | | 361/679.02 |
| 2013/0027862 A1* | 1/2013 | Rayner | | H04B 1/3888 |
| | | | | 361/679.3 |
| 2013/0342785 A1 | 12/2013 | Tsai et al. | | |
| 2014/0036420 A1* | 2/2014 | Chen | | A45C 11/00 |
| | | | | 361/679.01 |
| 2018/0199123 A1 | 7/2018 | Rao et al. | | |
| 2019/0191266 A1* | 6/2019 | Wang | | H04W 4/80 |

* cited by examiner

ELECTRONIC DEVICE

This application is a National Stage of International Patent Application No. PCT/CN2022/083536 filed on Mar. 29, 2022, which claims priority to Chinese Patent Application No. 202110522258.8 filed on May 13, 2021, which claims priority to Chinese Patent Application No. 202110379344.8 filed on Apr. 8, 2021. All of the aforementioned applications are hereby incorporated by reference in their entireties.

TECHNICAL FIELD

Embodiments of this application relate to the field of terminals, and in particular, to an electronic device.

BACKGROUND

With continuous development of electronic device forms and technologies, an ultra-thin design has become a trend. An external protective cover of a display screen and chip-on-film (COF) packaging for a flexible printed circuit board of the display screen is located on an outer side of the display screen. The external protective cover is thick and protrudes from the display screen, and an overall structure of the external protective cover is not compact. Therefore, visual experience of a user is affected.

SUMMARY

Embodiments of this application provide an electronic device. The electronic device can effectively reduce a thickness of a display screen assembly through structure optimization.

A first aspect of embodiments of this application provides an electronic device. The electronic device includes a display screen assembly and a protection assembly. The protection assembly is disposed along a side edge of the display screen assembly, and includes a decorative layer, a support, and a buffer layer. The support is located on a side of the display screen assembly and is fastened to the side edge of the display screen assembly. The decorative layer is located on an outer side of the display screen assembly and the support. A first part of the decorative layer is bonded to a first surface of the support through a first adhesive layer, a second part of the decorative layer abuts against a screen surface through the buffer layer, and the first surface is a surface that is on the support and that is located on a side of the screen surface of the display screen assembly. The first surface does not occupy assembling space of the screen surface. After being assembled, the support is located on an inner side of the decorative layer, the decorative layer fastened to an outer side of the support is used as a structure for pressing against the display screen, and a product contour is formed by the decorative layer. Thickness sizes of the decorative layer and the buffer layer are properly controlled, so that a thickness of the protection assembly can be effectively reduced, which complies with a light and thin design trend of an electronic device.

In actual application, based on a split design in which the decorative layer is independent of the support, the decorative layer may be made of a material different from a material of the support, for example, but not limited to a metallic material with good rigidity, to further reduce the thickness of the protection assembly.

For example, the first surface of the support may not protrude from the screen surface of the display screen assembly, to avoid occupying a space size of the outer side of the display screen in a thickness direction, so that the thickness of the protection assembly is reduced.

Based on the first aspect, embodiments of this application further provide a first embodiment of the first aspect: The electronic device further includes a speaker located on an inner side of the protection assembly. The support and the first adhesive layer each are provided with an avoidance opening corresponding to a speaker opening of the speaker, to form a sound output channel. A speaker mesh structure is configured in an area that is of the decorative layer and that is at least corresponding to the avoidance openings. Therefore, the decorative layer helps implement a function of the speaker. In other words, such embodiment is equivalent to that the speaker mesh of the speaker implements a function of pressing against the display screen, so that a thickness size is effectively reduced and a user can perceive a front speaker. Therefore, user experience can be further improved.

Based on the first embodiment of the first aspect, embodiments of this application further provide a second embodiment of the first aspect: the speaker mesh structure is configured in an entire area of the decorative layer. In this way, the user can perceive the front speaker, and the support is hidden on an inner side of a visible surface that includes a complete speaker mesh. Therefore, better visual experience is provided. This embodiment has a feature of a simple and practical structure.

Based on the second embodiment of the first aspect, embodiments of this application further provide a third embodiment of the first aspect: A shielding mesh is bonded to an inner side surface of the speaker mesh structure through a second adhesive layer. Therefore, compared with a solution in which the shielding mesh covers the avoidance opening, in this embodiment, the shielding mesh covers an inner surface of the speaker mesh, which avoids a visible color difference on an outer side of the speaker mesh.

For example, the shielding mesh may be made of a mesh fabric or a non-woven fabric, so that a thickness size can be controlled and manufacturing and assembly costs are low.

Based on the third embodiment of the first aspect, embodiments of this application further provide a fourth embodiment of the first aspect: the second adhesive layer is a water-based adhesive layer. In this way, in addition to grid bonding surfaces of the shielding mesh, side surfaces of the mesh are immersed in the water-based adhesive, so that a reliability requirement of bonding fastening between the shielding mesh and the speaker mesh may be met, and a sound permeability of the speaker may be maintained.

In actual application, the second adhesive layer may be formed by immersing the shielding mesh in the water-based adhesive, so that a processability is good and a feature of the water-based adhesive may be fully utilized.

Based on the first aspect, or the first embodiment of the first aspect, or the second embodiment of the first aspect, or the third embodiment of the first aspect, or the fourth embodiment of the first aspect, embodiments of this application further provide a fifth embodiment of the first aspect: The first adhesive layer is a hot melt adhesive layer, so that bonding is reliable and costs are controllable. In addition, based on good affinity between the hot melt adhesive and the water-based adhesive, assembling reliability of the protection assembly may be improved as a whole.

Based on the first embodiment of the first aspect, the second embodiment of the first aspect, the third embodiment of the first aspect, the fourth embodiment of the first aspect, or the fifth embodiment of the first aspect, embodiments of this application further provide a sixth embodiment of the first aspect: The first adhesive layer includes an extending part. The extending part extends toward the buffer layer and extends out of an extending part of the support. The second part of the decorative layer abuts against the screen surface through a first end side of the buffer layer, a second end side of the buffer layer is superposed on and bonded to the extending part of the first adhesive layer, and the first end side and the second end side are disposed opposite to each other. In this way, a superposed-bonding area between the buffer layer and the first adhesive layer is formed, and light-shielding blocking is constructed between the buffer layer and the support structure, so that a possibility of light transmission between the buffer layer and the support structure may be completely avoided. Therefore, the protection assembly is integrated with a loud-speaking function and the display screen assembly maintains good display performance.

In actual application, the second end side of the buffer layer may be located on an inner side of the extending part of the first adhesive layer, or the second end side of the buffer layer may be located on an outer side of the extending part of the first adhesive layer. Either way, light-shielding blocking may be formed through a reliable bonding relationship.

For example, the first end side of the buffer layer may be disposed inside the decorative layer, so that a reliable pressing relationship is ensured and an appearance is good.

For example, the buffer layer may be a sponge strip, so that a thickness size may be controlled.

Based on the first embodiment of the first aspect, the second embodiment of the first aspect, the third embodiment of the first aspect, the fourth embodiment of the first aspect, the fifth embodiment of the first aspect, or the sixth embodiment of the first aspect, embodiments of this application further provide a seventh embodiment of the first aspect: The display screen assembly includes a liquid crystal display, and the liquid crystal display includes a display screen circuit COF. An avoidance space is provided on a side that is of the support and that is close to the liquid crystal display, so that an installation avoidance space of the display screen circuit COF is formed, to avoid affecting a pin connection between the circuit COF and the display screen assembly. In addition, a shielding plate is bonded and fastened to a position that is of the first adhesive layer and that is opposite to the avoidance space, to prevent a bent circuit COF from being bonded to the first adhesive layer through a material removal part, so that a reliable pin connection relationship is ensured.

For example, the shielding plate is made of mylar.

Based on the seventh embodiment of the first aspect, embodiments of this application further provide an eighth embodiment of the first aspect: The shielding plate extends from the first adhesive layer to a second surface, and the second surface is a surface that is of the support and that is opposite to the display screen circuit COF. In this way, the display screen circuit COF may be protected, and a burr or an acute part that is generated when the material removal part is formed does not wear the display screen circuit COF.

Based on the first aspect, the first embodiment of the first aspect, the second embodiment of the first aspect, the third embodiment of the first aspect, the fourth embodiment of the first aspect, the fifth embodiment of the first aspect, the sixth embodiment of the first aspect, the seventh embodiment of the first aspect, or the eighth embodiment of the first aspect, embodiments of this application further provide a ninth embodiment of the first aspect: The decorative layer further includes a fastening part, and the fastening part is located on a side edge of a side that is of the decorative layer and that does not abut against the screen surface. Correspondingly, the support is provided with an opening that matches the fastening part. Therefore, on a basis of a bonding fastening connection relationship between members established by the first adhesive layer and the second adhesive layer, by using a fastening connection manner established by the fastening part and the opening that matches the fastening part, connection reliability of the protection assembly is improved, and the protection assembly has good assembly processability.

DESCRIPTION OF EMBODIMENTS

Embodiments of this application provide an ultra-thin electronic device solution. In specific application of electronic devices such as a smart television and a display screen, the solution effectively reduces a thickness of a display screen assembly and considers visual experience of a user.

Without loss of generality, a protection assembly 10 is used as a description subject in this embodiment. In a display apparatus 100 shown in FIG. 1, the protection assembly 10 is located at a bottom side edge of the display screen assembly 20. Components and assembling relationships between the components of a protection assembly 1 are described in detail in the following. It should be understood that, based on different product design requirements, the display screen assembly 20 of the electronic device may be an LCD display screen or an LED display screen. An example embodiment of the display screen assembly is not a core inventive idea of this application, and therefore does not constitute a substantive limitation on the electronic device within the protection scope of this application.

Embodiment 1

Figure 1:
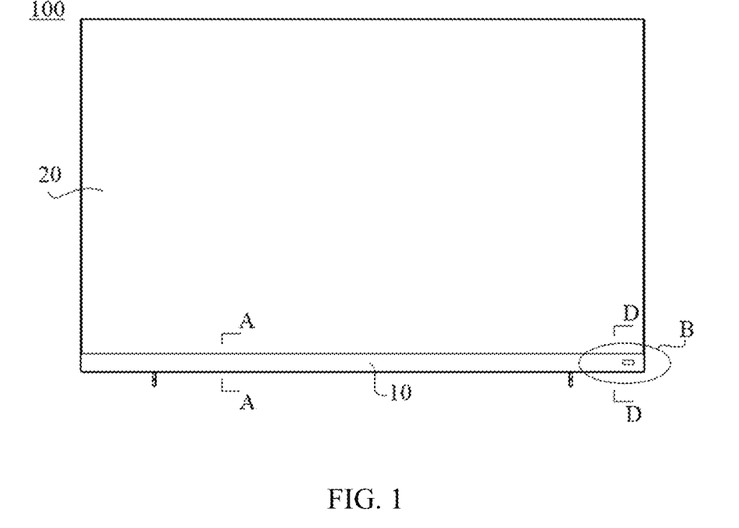
FIG. 1 is a main view of an electronic device according to Embodiment 1 of this disclosure.

Refer to FIG. 1. A display screen assembly 20 of a display apparatus provided in this embodiment uses a liquid crystal display (LCD) display screen 201. A speaker 30 of the display apparatus is at a bottom of the display screen assembly 20. A protection assembly 10 is disposed on an outer side the speaker 30 along the bottom side edge of the display screen assembly 20. An orientation term "outer side" used herein and orientation terms "inner side" and "side" used in the following are defined through a body of the display apparatus as a reference, to clearly describe relative position relationships between components or structures of the solution.

Figure 2:
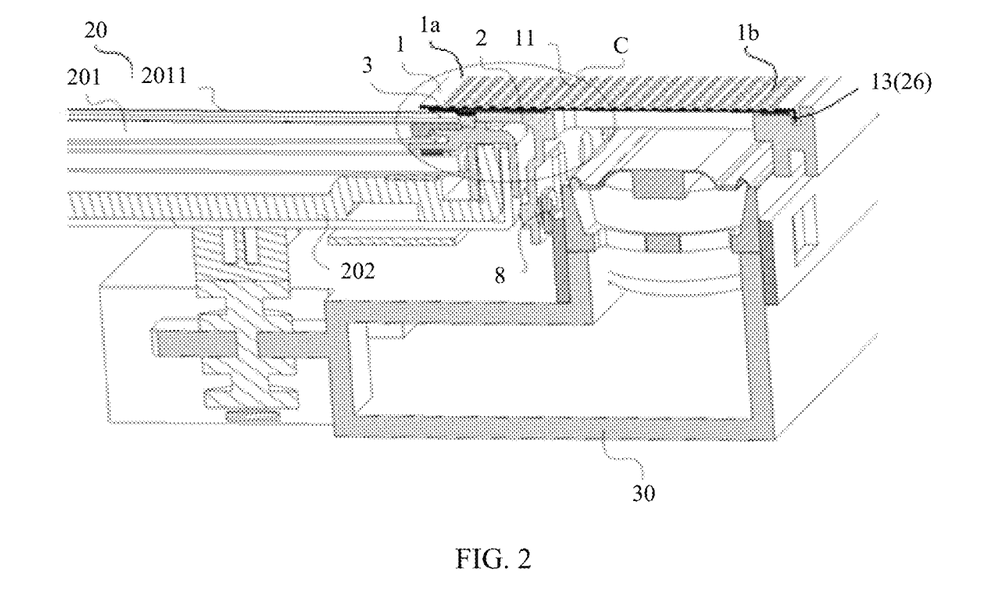
FIG. 2 is a schematic diagram of assembly of a protection assembly and a display screen assembly formed at an A-A cutting position in FIG. 1.
Figure 3:
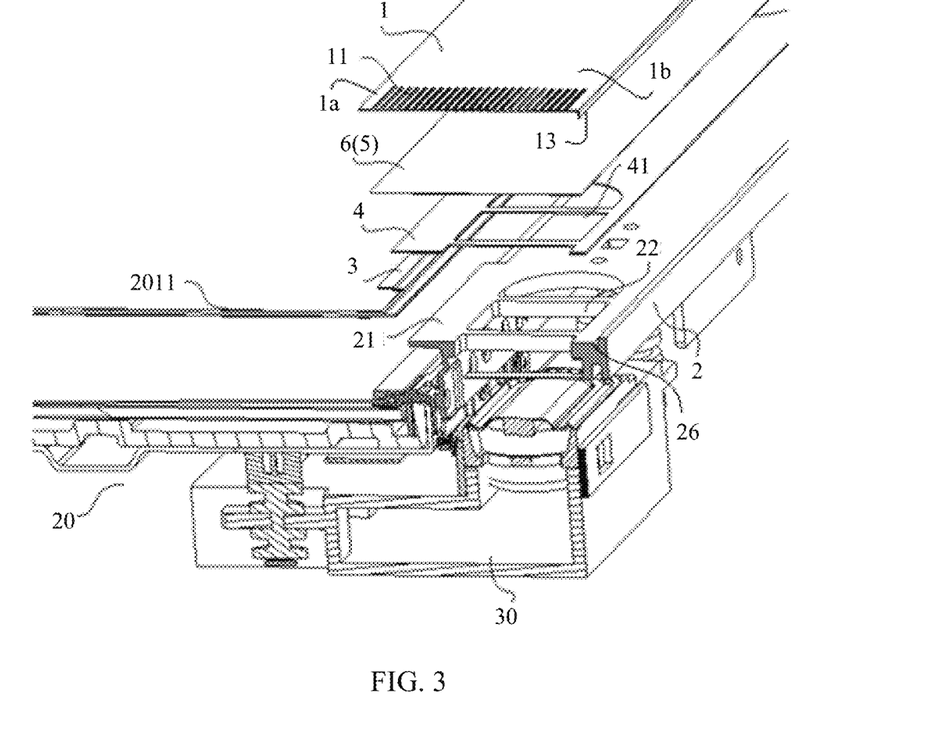
FIG. 3 is an exploded view of the assembly of the protection assembly and the display screen assembly shown in FIG. 2.

The protection assembly 10 includes a decorative layer 1, a support 2, and a buffer layer 3. Refer to FIG. 2 and FIG. 3. The decorative layer 1 is located on an outer side of the display screen assembly 20 and the support 2. The support 2 is located on a side of the display screen assembly 20, and fastened to a side edge of the display screen assembly 20, to establish a basic fastening connection between the protection assembly 10 and the display screen assembly 20. In actual application, depending on different structure designs of a body of the display screen assembly 20, the support 2 may be fastened in different manners. For example, but not limited to, the support 2 is fastened to a fastening structure 202 on a back side of the display screen 201 through a threaded fastener 8 shown in FIG. 2. In other words, the support 2 does not occupy assembling space on a screen surface, and establishes the foregoing fastening connection only through an end surface structure on the side of the display screen assembly 20.

Figure 5:
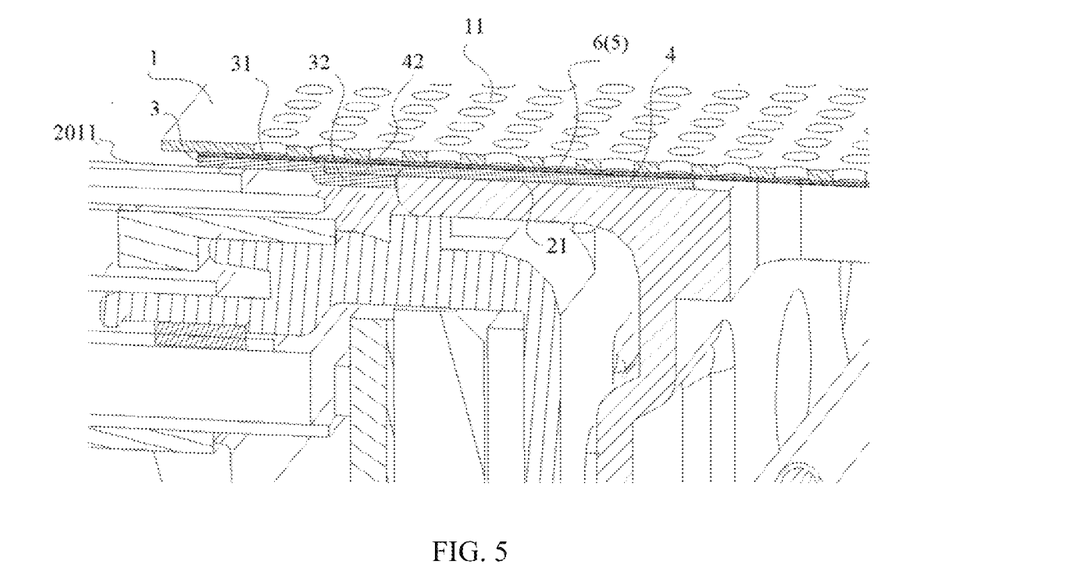
FIG. 5 is an enlarged view of a part C in FIG. 2.

Refer to FIG. 3 and FIG. 5. The support 2 includes a first surface 21 located on a side of the screen surface 2011 of the display screen assembly 20. A first part of the decorative layer 1 is bonded to the first surface 21 of the support 2 through a first adhesive layer 4, and a second part of the decorative layer 1 abuts against the screen surface through the buffer layer 3. Herein, the "first part" and the "second part" are two functional areas on a body of the decorative layer 1. The "second part" is configured to press against the screen surface, and the "first part" is configured to be bonded to the first surface of the support 2 to implement the basic fastening connection of the decorative layer 1. It should be understood that the "first part" and the "second part" may be different areas on the body of the decorative layer 1.

Optionally, the decorative layer 1 may be a planar structure, and the first part and the second part are on the planar structure. The decorative layer may also be a bending structure. Refer to FIG. 2 and FIG. 3. A part of the first part 1*b* and the second part 1*a* are on a same plane, and another part 13 of the first part 1*b* is bent to another plane. Correspondingly, the first surface 21 of the support 1 may be provided with a slot 26, and the another part 13 formed by bending may be embedded in the slot 26 of the support 1. In this way, a more reliable bonding and fastening relationship may be formed.

As shown in FIG. 2, at a position corresponding to a speaker opening of the speaker 30, the support 2 is provided with an avoidance opening 22, and the first adhesive layer 4 is provided with an avoidance opening 41, to establish a sound output channel. Correspondingly, a speaker mesh structure 11 is disposed in an area that is on the decorative layer 1 and that is at least corresponding to the avoidance openings (22 and 41). In this way, the decorative layer 1 configured to press against the display screen 201 helps implement a function of a speaker mesh of the speaker 30. In other words, such embodiment is equivalent to that the speaker mesh of the speaker 30 implements a function of pressing against the display screen 201.

Figure 4:
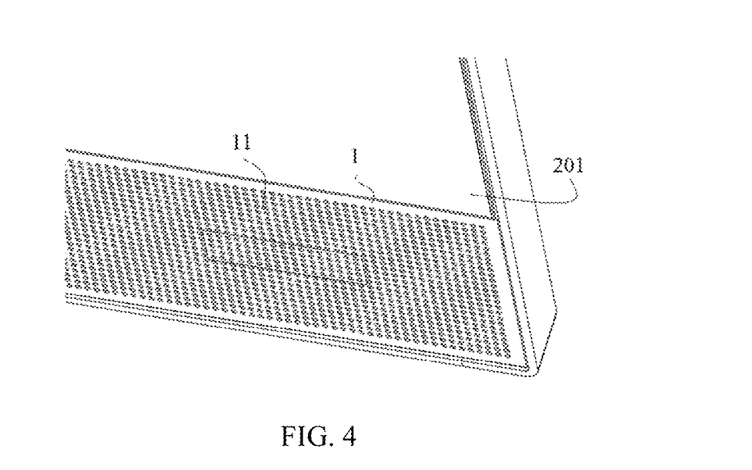
FIG. 4 is an enlarged view of a part B in FIG. 1.

After being assembled, the support 2 is located on an inner side of the decorative layer 1, and the decorative layer 1 on an outer side of the support 2 is configured to press against the display screen 201. As shown in FIG. 4, based on a feature that a size of a front outer contour is limited by the decorative layer 1, a thickness of the protection assembly 10 may be effectively reduced by properly controlling thicknesses of the decorative layer 1 and the buffer layer 3. In addition, in the display apparatus provided in this embodiment, the speaker mesh and the decorative layer that presses against the display screen are integrated as a whole, so that a thickness size is effectively reduced and a user may perceive a front speaker. Therefore, the visual experience of the user can be further improved.

In this embodiment, the decorative layer 1 may be made of a material different from a material of the support 2. For example, but not limited to, the support 2 is made of light plastic, to control a weight of the entire device. The decorative layer 1 is made of a metal material with good rigidity, for example, but not limited to a stainless steel material. Therefore, the decorative layer may reliably press against the display screen and a thickness of the decorative layer 1 may be minimized. An SUS304 stainless steel material is used as an example. A decorative layer 1 with a thickness of 0.3 mm may be manufactured, and a small gap between the decorative layer 1 and the screen surface 2011 may be controlled to be 0.4 mm.

In actual application, the first surface 21 of the support 2 that is properly attached to the decorative layer 1 may be approximately flush with the screen surface 2011. Refer to FIG. 5. Certainly, the "approximately flush" relative position relationship is formed based on a fact that a thickness of the buffer layer 3 tends to be consistent with a thickness of the first adhesive layer 4 after pressing. It may be understood that the first surface 21 does not protrude from the screen surface 2011, so that overall control of a thickness size may be more conveniently implemented.

Figure 6:
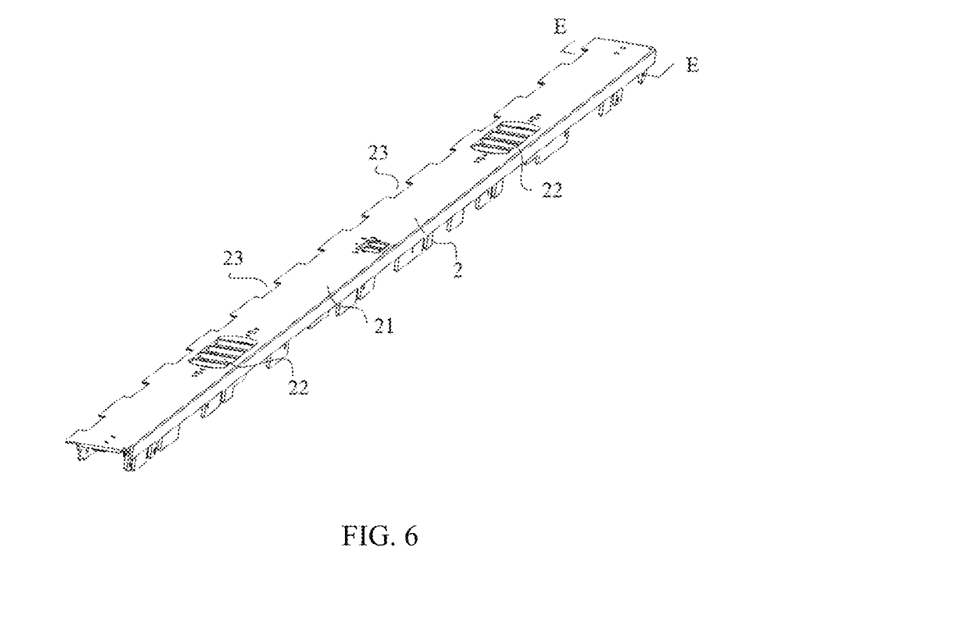
FIG. 6 is a schematic diagram of a structure of a support of an electronic device according to Embodiment 1 of this disclosure.

It should be understood that, based on a function attribute of the speaker, the sound output channel disposed on the protection assembly 10 needs to be disposed corresponding to a quantity and an example position of the speaker 30. The display apparatus in this embodiment includes two speakers 30. As shown in FIG. 6, avoidance openings 22 are provided on two corresponding positions on the support 2, and avoidance openings 41 are provided on two positions on the first adhesive layer 4 same as the two corresponding positions on the support 2 (not shown in the figure).

As shown in FIG. 3, the avoidance openings (22 and 41) are hollow. An example size and shape of the avoidance openings may be provided based on an overall design requirement, to match a bearing capacity of a body of the support 2 at the opening positions.

Refer to FIG. 4. The speaker mesh structure 11 may be configured in an entire area of the decorative layer 1. From a user perspective, it is equivalent to that the support 2 is configured within a visible surface that includes a complete speaker mesh. A design of the ultra-thin protection assembly can further provide the user with visual experience that the speaker mesh is of a full-size surface on the bottom. For example, the decorative layer 1 is manufactured by using the SUS304 stainless steel, and the foregoing speaker mesh structure 11 may be formed on the decorative layer 1 through an etching process.

That the speaker mesh structure 11 is configured in the "entire area" herein means that an area of a surface of the decorative layer 1 is provided with the speaker mesh structure 11, on condition that a process requirement for a hole forming or a mesh forming is met. Therefore, the foregoing visual experience of the user is obtained. It should be noted that, that the speaker mesh structure 11 is configured in the "entire area" includes a case in which a mesh hole pattern of the speaker mesh structure is regular or irregular, and also includes a case in which a process frame without mesh holes is reserved on an outer edge of the decorative layer 1.

Refer to FIG. 3. To further improve the visual experience of the user, a shielding mesh 6 is bonded to an inner surface of the speaker mesh structure in this embodiment through a second adhesive layer 5. That is, the shielding mesh 6 is used to cover the inner side of the decorative layer 1. Not only a function requirement of the speaker may be met, but also a uniform shielding effect for the speaker mesh structure is formed. In this way, compared with a solution in which the shielding mesh 6 covers the avoidance openings (22 and 41), in this embodiment, the shielding mesh 6 covers an inner surface of the speaker mesh, which avoids a visible color difference on an outer side of the speaker mesh structure.

In actual application, the shielding mesh 6 may be made of a mesh fabric or a non-woven fabric, so that a thickness size can be controlled and manufacturing and assembly costs are low. The second adhesive layer 5 may be a water-based adhesive layer. Specifically, the second adhesive layer 5 may be formed by immersing the shielding mesh 6 in the water-based adhesive. Based on a feature that the water-based adhesive uses water as a solvent, in addition to grid surfaces of the shielding mesh, side surfaces of the mesh are immersed in the water-based adhesive, to form the second adhesive 5 that penetrates the shielding mesh 6. On the whole, the reliability of bonding fastening between the shielding mesh 6 and speaker mesh structure may be enhanced, and good sound permeability of the speaker can be obtained after the water-based adhesive layer cures, that is, a function requirement of the speaker can be met.

In addition, the first adhesive layer 4 in this embodiment is a hot melt adhesive layer, which has good bonding processability and low manufacturing costs. In addition, based on good affinity between the hot melt adhesive and the water-based adhesive, good reliability of a bonding relationship between the decorative layer 1 and the support 2 may be obtained.

To avoid a light transmission phenomenon, as shown in FIG. 5, for a manner in which a speaker mesh structure is configured in the entire area of the decorative layer 1, the first adhesive layer 4 includes an extending part 42, the extending part 42 extends toward the buffer layer 3 and extends out of the support, the second part of the decorative layer 1 abuts against the screen surface through a first end side 31 of the buffer layer 3, and a second end side 32 of the buffer layer 3 is superposed on and bonded to the extending part 42 of the first adhesive layer 4. In this way, the foregoing superposed-bonding area between the buffer layer 3 and the first adhesive layer 4 is formed, and light-shielding blocking is formed between the buffer layer 3 and the support 2, so that light transmission between the buffer layer 3 and the support 2 is avoided, to ensure that the display screen assembly maintains good display screen performance. Herein, the first end side 31 and the second end side 32 are two parts that are of the buffer layer 3 and that are disposed opposite to each other, instead of two separate components.

In this embodiment, the second end side 32 of the buffer layer 3 may be located on an inner side of the extending part 42 of the first adhesive layer 4, as shown in FIG. 5. The buffer layer 3 may be a sponge strip, so that a thickness size is controlled.

In another case of actual application, the second end side 32 of the buffer layer 3 may be alternatively located on an outer side of the extending part 42 of the first adhesive layer 4. In this way, an effect light-shielding blocking may be implemented through a superposed-bonding area. In addition, the buffer layer 3 may be a silicone strip or a rubber strip.

For example, but not limited to, the first end side 31 of the buffer layer 3 is received at the decorative layer 1, as shown in FIG. 5, so that a pressing relationship is reliable and an appearance is good.

Figure 7:
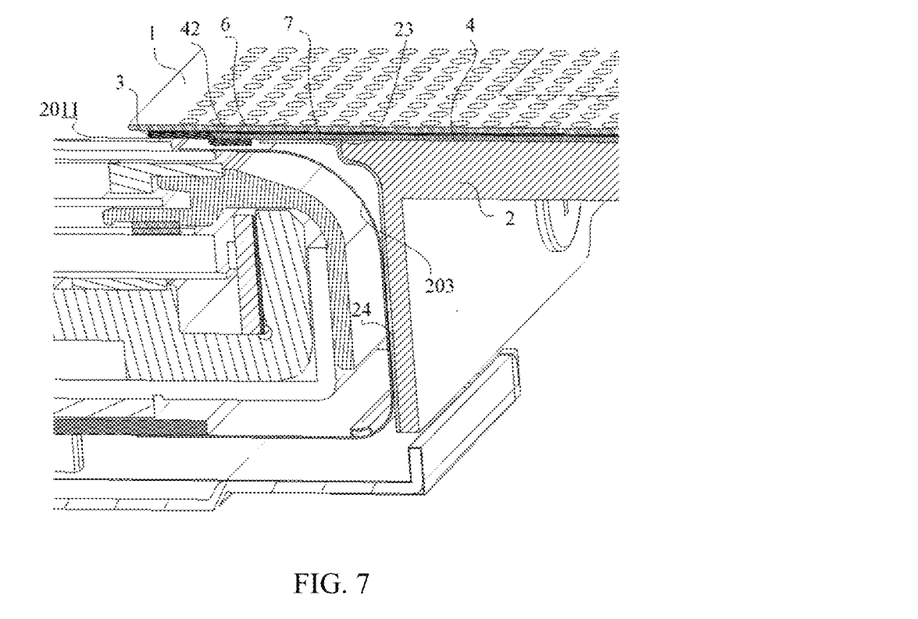
FIG. 7 is a schematic diagram of assembly of the protection assembly and the display screen assembly formed at a D-D cutting position in FIG. 1.
Figure 8:
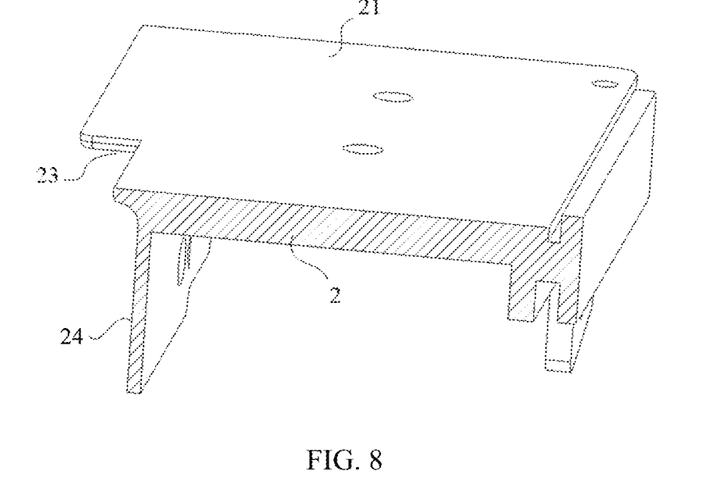
FIG. 8 is a sectional view along E-E in FIG. 6.

In this embodiment, as shown in FIG. 7 and FIG. 8, the display screen circuit COF 203 of the LCD display screen 201 is disposed at a bottom of the display screen 201. An avoidance space 23 is provided on the support 2 and located on a side that is of the support 2 and that is close to the LCD display screen 201, so that an installation avoidance space of the display screen circuit COF 203 is formed, to avoid affecting a pin connection between the circuit COF and the display screen assembly. It may be understood that an actual configuration quantity of display screen circuit COFs is determined based on an example model and size of the display screen 201. In this embodiment, a quantity of and specific opening positions of avoidance spaces 23 on the support 2 need to be correspondingly set.

As shown in FIG. 7, a shielding plate 7 is bonded and fastened at a position that is on the first adhesive layer 4 and that is opposite to an avoidance space 23, to prevent a bent circuit COF 203 from being bonded to the first adhesive layer 4 through the avoidance space and to prevent the circuit COF 203 from being bonded to the first adhesive layer 4 at the position and thus affecting a reliable pin connection relationship.

In some actual application, the avoidance space 23 may be formed in an integrated manner with the body of the support 2, or may be formed through secondary processing in a machining manner. To prevent a burr or an acute part that is generated when the avoidance space 23 is formed from contacting and wearing the display screen circuit COF 203, the shielding plate 7 may be extended from the first adhesive layer 4 to a second surface 24 that is of the support 2 and that is opposite to the display screen circuit COF 203. The second surface 24 is a surface faces a bottom side edge of the display screen assembly 20. The second surface 24 is perpendicular to the first surface 21. This embodiment has a feature of good assembly processability.

In this embodiment, the shielding plate 7 is made of mylar, so that it is easy for the shielding plate to take shape based on internal structure space, and manufacturing costs for the shielding plate are low.

Figure 9:
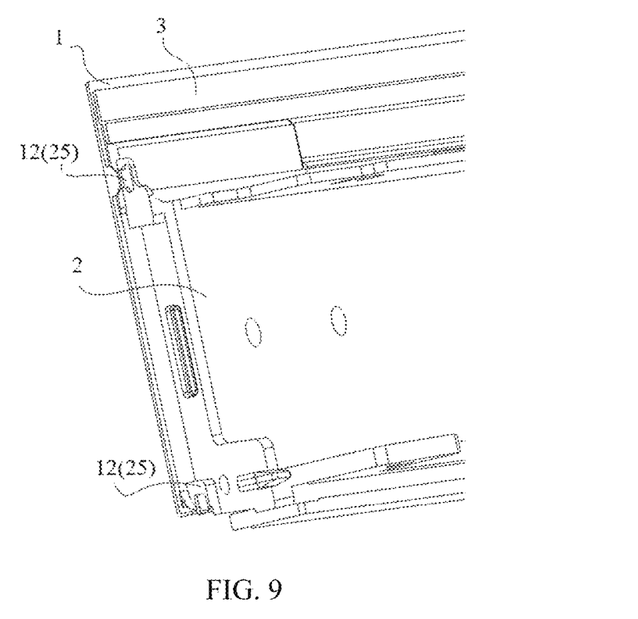
FIG. 9 is a partial schematic diagram of a protection assembly from a rear side perspective according to Embodiment 1 of this disclosure.

To improve integrated connection reliability of the protection assembly 10, a fastening part 12 is disposed on a side edge of the decorative layer 1. As shown in FIG. 9, an opening 25 that matches the fastening part 12 is disposed on the support 2. Certainly, based on an adaptation relationship that a top side edge of the decorative layer 1 presses against the screen surface, the fastening part 12 may be disposed on a side edge of a side that is of the decorative layer 1 and that does not abut against the screen surface. Specifically, the fastening part 12 may be disposed on a left side edge, a right side edge, and a bottom side edge of the decorative layer 1.

Figure 10:
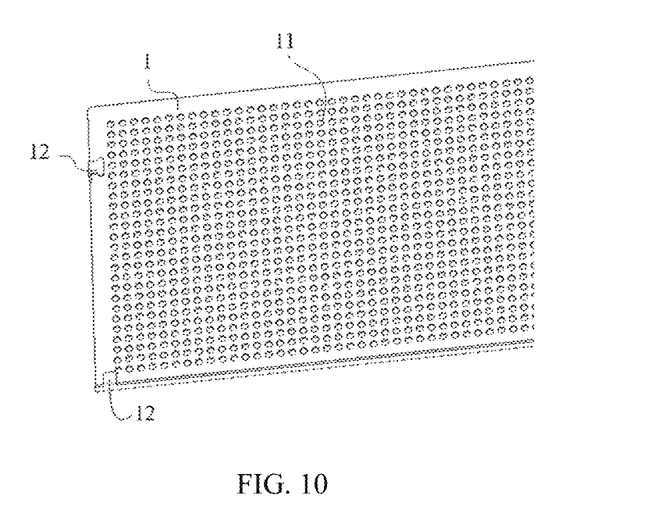
FIG. 10 is a schematic diagram of a structure of a decorative layer shown in FIG. 9.

The fastening part 12 and the opening 25 that matches to the fastening part 12 may be implemented in different structural forms, on condition that a fastening connection manner between the decorative layer 1 and the support 2 may be established. Refer to FIG. 9 and FIG. 10 together. The two figures show matching fastening structures located at an end of a side of the protection assembly 10. In this embodiment, one fastening part 12 may be disposed on each of short side edges (left and right sides) of the decorative layer 1, and a plurality of fastening parts 12 may be disposed at intervals on a long side edge (bottom side) of the decorative layer 1. As shown in the figure, each fastening part 12 is formed by bending inwards from a corresponding side edge of the decorative layer 1, the support 2 is attached to the decorative layer 1, and each fastening part 12 is fastened to a corresponding opening 25.

The following briefly describes main process steps of manufacturing and assembling the protection assembly 10 in this embodiment:

1: Manufacture the decorative layer 1 that includes the speaker mesh structure 11 and the support 2 that includes an avoidance opening.
2: Immerse the shielding mesh 6 in the water-based adhesive to form the second adhesive layer 5 that penetrates the shielding mesh 6, and bond the shielding mesh 6 on the speaker mesh structure 11 through the second adhesive layer 5.
3: Attach the first component to the first surface of the support 2 through the first adhesive layer 4 (hot melt adhesive).
4: Attach the support 2 to the decorative layer 1, and fasten each fastening part 12 to a corresponding opening 25.
5: Bond the second end side 32 of the buffer layer 3 to an extending part 42 that extends out of the support 2 and that is of the first adhesive layer 4.
6: Cover the first adhesive layer 4 at the position opposite to the avoidance space of the support 2 through the shielding plate 7 made of mylar, to form the protection assembly 10.

Finally, assemble the protection assembly 10 on the bottom side edge of the display screen assembly 20. Fasten the support 2 to the fastening structure 202 of the display screen assembly through a threaded fastener. The decorative layer 1 presses against the screen surface 2011 through the first end side 31 of the buffer layer 3. After assembling the protection assembly 10 and the display screen assembly, fasten the speaker 30 installed in place to the fastening structure 202.

According to the display apparatus 100 provided in this embodiment, based on an ultra-thin decorative layer 1 and a design of a small gap between the ultra-thin decorative layer 1 and the screen surface 2011, a solution of an ultra-thin protection assembly 10 integrated with a loud-speaking function is implemented.

Embodiment 2

Figure 11:
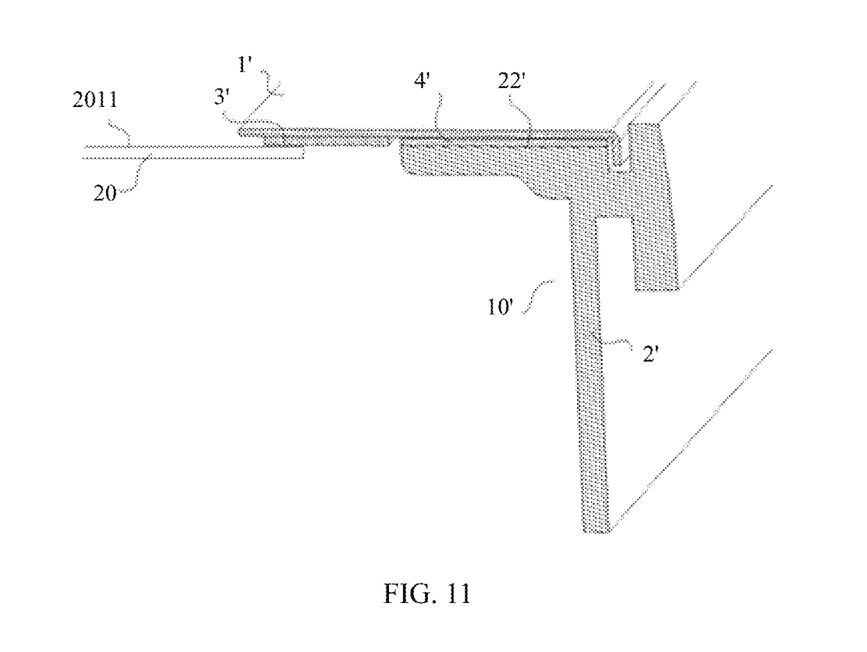
FIG. 11 is a schematic diagram of assembly of a protection assembly and a display screen assembly of an electronic device according to Embodiment 2 of this disclosure.

Refer to FIG. 11. In this embodiment, a protection assembly 10' is also disposed along the bottom side edge of the display screen assembly 20. Compared with Embodiment 1, a difference lies in that no speaker is disposed at a bottom of a display apparatus provided in this embodiment. To clearly show the difference and relationship between this embodiment and Embodiment 1, components and structures that have a same function in the figure are manifested through a same mark.

In this embodiment, the protection assembly 10' includes a decorative layer 1', a support 2', and a buffer layer 3', and the decorative layer 1' is located on an outer side of the display screen assembly 20 and the support 2'. An example configuration of the protection assembly 10' does not need to help implement a function of the speaker, so that combination is simpler.

As shown in the figure, the decorative layer 1' that is located on the outer side of the display screen assembly 20 and the support 2'. The decorative layer 1' is bonded to a first surface 21' of the support 2' through a first adhesive layer 4' and abuts against the screen surface 2011 through the buffer layer 3'. Similarly, a thickness of the protection assembly 10' may be effectively reduced by properly controlling thickness sizes of the decorative layer 1' and the buffer layer 3'.

A selection of materials of the decorative layer 1', the support 2', and the buffer layer 3' is the same as that in Embodiment 1. Details are not described herein again.

It should be noted that, in this embodiment, association structures such as the material removal part and the shielding plate (not shown in the figure) formed at corresponding positions of the support 2' and positions that adapt to the display screen circuit COF (not shown in the figure) may also be processed in same manners as that in Embodiment 1. Details are not described herein again.

In addition, design solutions of an ultra-thin protection assembly provided in the foregoing Embodiment 1 and Embodiment 2 may be applied to another product equipped with a liquid crystal display.

What is claimed is:

1. An electronic device comprising:
a display screen assembly; and
a protection assembly disposed along a side edge of the display screen assembly; the protection assembly including a decorative layer, a support, and a buffer layer, wherein:
the support is located on a side of the display screen assembly, and is fastened to the side edge of the display screen assembly; and
the decorative layer is located on an outer side of the display screen assembly and the support, a first part of the decorative layer is bonded to a first surface of the support through a first adhesive layer, a second part of the decorative layer abuts against a screen surface through the buffer layer, and the first surface is a surface that is on the support and that is located on a side of the screen surface of the display screen assembly.

2. The electronic device of claim 1, further comprising a speaker located on an inner side of the protection assembly, wherein the support and the first adhesive layer each are provided with an avoidance opening corresponding to a speaker opening of the speaker, and a speaker mesh structure is configured in an area that is of the decorative layer and that is at least corresponding to the avoidance openings.

3. The electronic device of claim 2, wherein the speaker mesh structure is configured in an entire area of the decorative layer.

4. The electronic device of claim 2, wherein a shielding mesh is bonded to an inner surface of the speaker mesh structure through a second adhesive layer.

5. The electronic device of claim 4, wherein the second adhesive layer is a water-based adhesive layer.

6. The electronic device of claim 1, wherein the first adhesive layer is a hot melt adhesive layer.

7. The electronic device of claim 2, wherein the first adhesive layer comprises an extending part, the extending part extends toward the buffer layer and extends out of the support, the second part of the decorative layer abuts against the screen surface through a first end side of the buffer layer, a second end side of the buffer layer is superposed on and bonded to the extending part of the first adhesive layer, and the first end side and the second end side are disposed opposite to each other.

8. The electronic device of claim 3, wherein the first adhesive layer comprises an extending part, the extending part extends toward the buffer layer and extends out of the support, the second part of the decorative layer abuts against the screen surface through a first end side of the buffer layer, a second end side of the buffer layer is superposed on and bonded to the extending part of the first adhesive layer, and the first end side and the second end side are disposed opposite to each other.

9. The electronic device of claim 4, wherein the shielding mesh is made of a mesh fabric or a non-woven fabric.

10. The electronic device of claim 1, wherein the decorative layer is made of a metallic material.

11. The electronic device of claim 1, wherein the buffer layer is a sponge strip.

12. The electronic device of claim 1, wherein the display screen assembly comprises a liquid crystal display, the liquid crystal display comprises a display screen circuit COF, an avoidance space is provided on a side that is of the support and that is close to the liquid crystal display, and a shielding plate is bonded and fastened to the first adhesive layer that is opposite to the avoidance space.

13. The electronic device of claim 12, wherein the shielding plate is made of mylar.

14. The electronic device of claim 12, wherein the shielding plate extends from the first adhesive layer to a second surface of the support, and the second surface is a surface that is of the support and that is opposite to the display screen circuit COF.

15. The electronic device of claim 13, wherein the shielding plate extends from the first adhesive layer to a second surface of the support, and the second surface is a surface that is of the support and that is opposite to the display screen circuit COF.

16. The electronic device of claim 1, wherein the decorative layer further comprises a fastening part, the fastening part is located on a side edge that is of the decorative layer and that does not abut against the screen surface, and correspondingly, the support is provided with an opening that matches the fastening part.

17. The electronic device of claim 1, wherein the decorative layer further comprises a fastening part, the fastening part is located on a side edge that is of the decorative layer and that does not abut against the screen surface, and correspondingly, the support is provided with an opening that matches the fastening part.

* * * * *